United States Patent [19]

Albury

[11] 4,419,904

[45] Dec. 13, 1983

[54] RECIPROCATING DEVICE

[76] Inventor: Randolph R. Albury, P.O. Box N 7512, Nassau, The Bahamas

[21] Appl. No.: 306,179

[22] Filed: Sep. 28, 1981

Related U.S. Application Data

[63] Continuation-in-part of Ser. No. 14,872, Feb. 26, 1979, abandoned.

[51] Int. Cl.³ .............................................. F16H 21/22
[52] U.S. Cl. ...................................... 74/44; 308/6 R; 30/394
[58] Field of Search ................. 30/169, 218, 220, 242, 30/392, 393, 394; 51/59 R, 170 TL; 74/44, 50; 308/6 R

[56] References Cited

U.S. PATENT DOCUMENTS

| | | | |
|---|---|---|---|
| 1,362,628 | 12/1920 | Kaunitz | 74/44 |
| 1,502,088 | 7/1924 | Colby | 74/44 |
| 1,793,053 | 2/1931 | Cahill et al. | 30/394 |
| 2,465,807 | 3/1949 | Jones | 51/170 TL |
| 2,721,586 | 10/1955 | Hill | 30/394 |
| 3,749,509 | 7/1973 | Lukoshnikov | 308/6 R |
| 3,890,708 | 6/1975 | Bauer | 30/393 |
| 4,137,632 | 2/1979 | Pfanzer | 74/50 |

FOREIGN PATENT DOCUMENTS

| | | | |
|---|---|---|---|
| 124672 | 7/1956 | France | 30/392 |
| 513 | of 1887 | United Kingdom | 30/220 |
| 135133 | 6/1960 | U.S.S.R. | 30/392 |

*Primary Examiner*—Lawrence J. Staab
*Attorney, Agent, or Firm*—John C. Malloy

[57] ABSTRACT

A reciprocating device which is composed of a base and a longitudinally movable member supported above the base on a support including rollers in engagement with the longitudinally extending member for guiding reciprocating movement of the member above the base and a motor connected through its drive shaft and wheels and gears to one end of the member for imparting cyclical or reciprocating movement to it above the base along a predetermined path defined by said rollers.

3 Claims, 3 Drawing Figures

RECIPROCATING DEVICE

This application is a continuation-in-part of a prior filed application, Ser. No. 014,872, filed Feb. 26, 1979, now abandoned.

FIELD OF THE INVENTION

This invention relates to reciprocating device and more particularly to a device for cyclical movement in a fore and aft direction.

BACKGROUND OF THE INVENTION

In the past there are numerous occasions where it is desirable to have a device which is adapted for cyclical movement of reciprocation along a generally predetermined path. This invention provides structure whereby a member is adapted to be moved in such a fashion and to the terminal end of which various fittings are adapted to be connected and to the other end of which a drive mechanism is connecting for imparting cyclical movement along the predetermined path.

OBJECTS OF THE INVENTION

It is, accordingly, an object of this invention to provide a reciprocating device which is useful for imparting a predetermined cyclical movement of reciprocation to a member and which in the preferred embodiment include means to support the member for yieldable movement vertically with respect to the path along which it is generally constrained to move by guide means when moved by a drive means in the form of a motor connected to the reciprocating member by a pivotally interconnected system including links.

In accordance with these and other objects which will become apparent hereinafter, the instant invention will now be described with reference to the accompanying drawings in which:

DESCRIPTION OF THE PREFERRED EMBODIMENT

Figure 1:
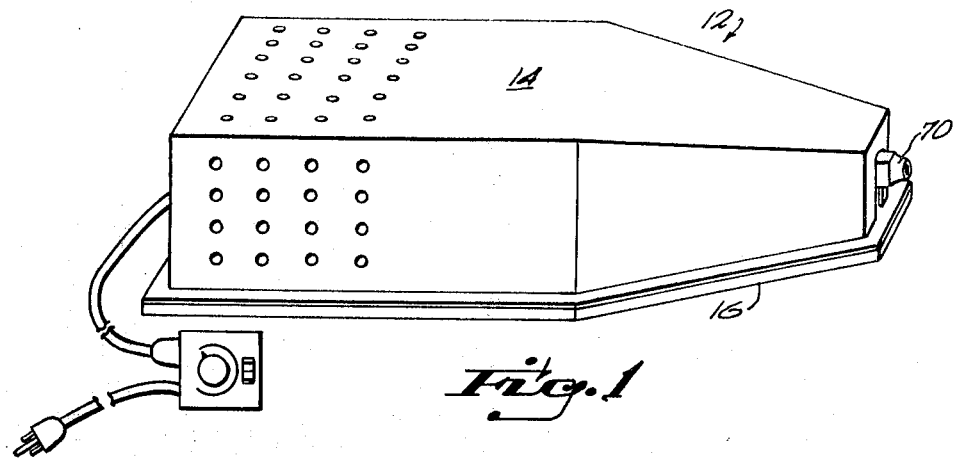
FIG. 1 is a perspective view of the instant invention.

Referring to the drawings wherein like reference characters designate like or corresponding parts throughout the several views, there is shown a machine and housing which in combination is generally designated by the numeral 12 in FIG. 1. It is composed of a mechanism which is mounted to a base 16 and over which a cup-shaped housing 14 is provided, which is preferably vented as shown.

Figure 2:
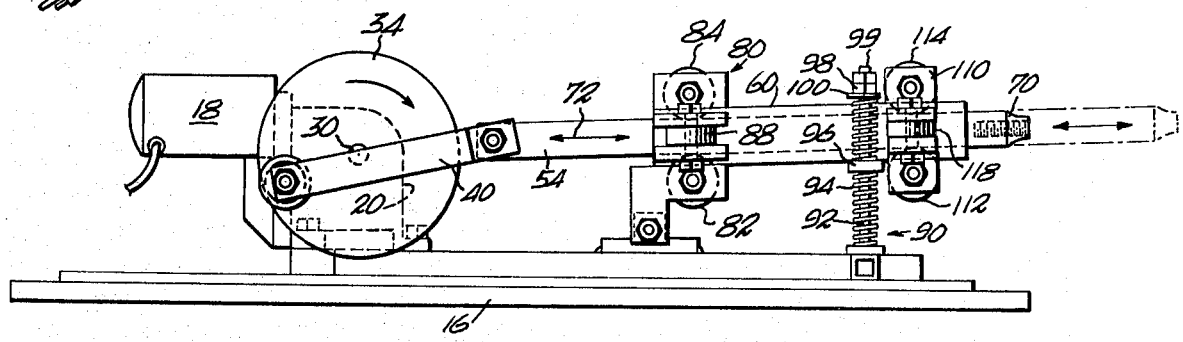
FIG. 2 is a side elevation view of a modified device similar to that shown in FIG. 1 with the cover 14 removed; and with an optional resilient means composed of a spring oriented vertically.
Figure 3:
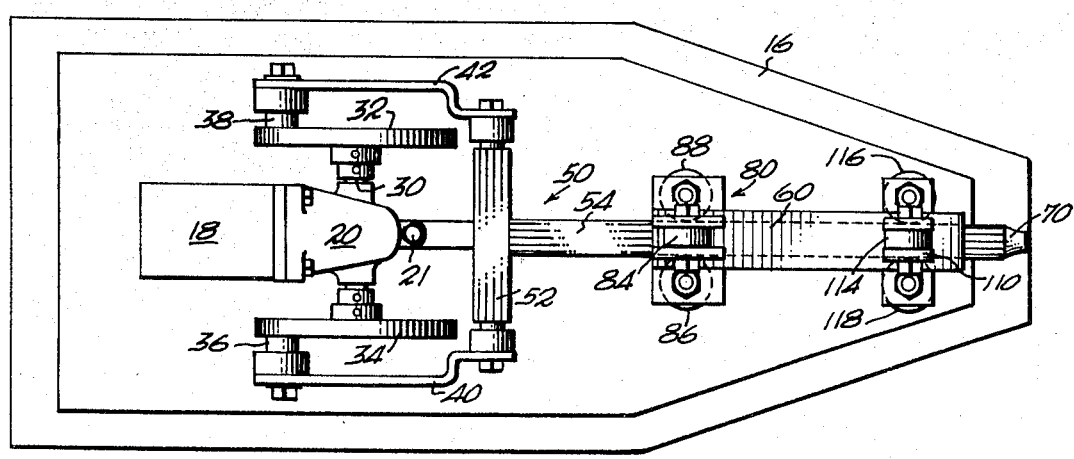
FIG. 3 is a top plan view of the device.

The machine is composed of a drive motor 18 which is suitably mounted to the base 16 and which includes a drive shaft 30 which through gear means is adapted to rotate wheels 32 and 34 which are parallel to one another and fixed to a common shaft. Each of these wheels is provided with an offset pivot, see 36 and 38, and each of these pivots are connected by a link 40 and 42, respectively to a cross bar 52 which is rigidly fixed on the end of a stem 54 of a T mechanism generally designated by the numeral 50. It is thus seen that upon rotational movement, movement of reciprocation will be imparted to the stem 54 and to a mounting 70 on the distal end thereof which may be adapted for screw-threaded connection with an attachment. Guide means are provided to constrain the stem to general longitudinal movement in the direction of the arrows indicated by the numeral 72. The guide means comprise a first pair of guide means comprising a pair of wheels 86 and 88 in confronting relation and in engagement with the sides of the stem 54 and a second pair of guide means comprising a second pair of wheels 116 and 118 which are also in engagement with the side of the stem 54. Preferably, a guide means in the form of a tube 60 is provided and the stem is reciprocal within this tube. Also, wheels 82 and 84 comprising lower and upper wheels engage the stem together with the wheels 86 and 88 as do the upper and lower wheels 112 and 114 in combination with the wheels 116 and 118. Also, in a preferred embodiment, as seen in FIG. 2, resilient mounting means may be provided adjacent the outer end of the stem and between the two guide means. This resilient mounting means is shown in FIG. 2 and may be utilized as desired. It is composed of a pair of upstanding studs 92 which are provided with coil springs thereabout and indicated by the numeral 94. Intermediate the length of the coil springs there is a bar 96 on which the underface of the stem tube 60 rests. The springs are captivated in this relationship by means of a washer 100, a lock 98 and this is in threaded engagement with the end 99 of the screw shown in FIG. 2.

It will thus be seen that the device is adapted for reciprocating movement in the direction of the arrows 72 and is yieldable adjustably with respect to vertical forces which may be applied to the end to respond to the somewhat tilting action which is imparted to the device.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A reciprocating device comprising:
   an elongate slide member having a first end, a second end, and an intermediate portion between the ends, and said slide member having slide surfaces;
   a tubular member sized for telescopically receiving the intermediate portion;
   a housing including a base;
   said base including eccentric reciprocating means and means connecting the reciprocating means to the first end of the slide member for reciprocating movement,
   said first end comprising a laterally projecting bar perpendicular to the slide member and symmetrical therewith;
   a first vertically resilient mounting means comprising a vertically oriented spring support means, said spring support means having a lower end secured to the base and an upper end about which a washer and lock means are fitted,
   a spring means about said support means, said spring means being held under tension by said washer and lock means and having an intermediate region, and, connector means mobily attached to said intermediate region of the spring means and said tubular member, said connector means normally urging said tubular member to a first vertical position and yieldable vertically upon application of a vertical force on the second end of said slide member during generally horizontal reciprocation movement; and mounting means on the slide member second end for connection with a driven removable working end;

said reciprocating means comprising, a drive means having a drive shaft, wheel means comprising a pair of wheels on a common axis opposed in confronting relation with the drive shaft intermediate the wheels, a drive motor having gear means on the drive shaft for rotating the wheel means, each wheel means including an eccentric with a crank connecting each wheel to the bar of said slide member first end, to imparting eccentric reciprocating movement to the slide member.

2. The device as set forth in claim 1 wherein guide means are provided on said tubular member comprising horizontally and vertically opposing pairs of rollers engaging the sides of the slide member.

3. The device as set forth in claim 2 wherein hood means are provided to enshroud said reciprocating device, said base including abutment means to engage said hood.

* * * * *